(12) United States Patent
Naik

(10) Patent No.: US 10,817,283 B1
(45) Date of Patent: Oct. 27, 2020

(54) AUTOMATED RISK ASSESSMENT FOR SOFTWARE DEPLOYMENT

(71) Applicant: AMAZON TECHNOLOGIES, INC., Seattle, WA (US)

(72) Inventor: Nachiket Vishnu Naik, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/359,004

(22) Filed: Mar. 20, 2019

(51) Int. Cl.
*G06F 9/44* (2018.01)
*G06F 8/71* (2018.01)
*G06F 8/30* (2018.01)

(52) U.S. Cl.
CPC . *G06F 8/71* (2013.01); *G06F 8/30* (2013.01)

(58) Field of Classification Search
CPC . G06F 8/443; G06F 8/433; G06F 8/30; G06F 8/427; G06F 8/441; G06F 8/65; G06F 8/71

USPC .................................................. 717/144, 170
See application file for complete search history.

(56) References Cited

U.S. PATENT DOCUMENTS

2015/0100940 A1\* 4/2015 Mockus .................... G06F 8/70
717/101

\* cited by examiner

*Primary Examiner* — Chuck O Kendall
(74) *Attorney, Agent, or Firm* — Lowenstein Sandler LLP

(57) ABSTRACT

A method for automated risk assessment of source code for a program includes detecting that a new version of source code for a program is available to be deployed by a software deployment pipeline, determining a portion of the new version of the source code that comprises one or more updates to a previous version of the source code, determining a risk weight value associated with the one or more updates, and determining whether the risk weight value meets a threshold value is determined. Responsive to determining that the risk weight value meets the threshold value, the method executes a high risk deployment protocol for the new version of the source code within the software deployment pipeline.

20 Claims, 8 Drawing Sheets

AUTOMATED RISK ASSESSMENT FOR SOFTWARE DEPLOYMENT

BACKGROUND

The software development lifecycle for many application development environments has progressed from scheduled releases to a continuous integration model that can meet the needs of a more demanding and evolving marketplace. To facilitate this type of model, a code pipeline can be implemented to automate the software release process for an application or service deployment. A code pipeline can automatically build, test, and deploy an application each time the source code is changed. When problems occur with any step in the process, the pipeline can be halted so that preventable bugs and errors are not automatically deployed. While this can accelerate workflows, conventional pipelines do not typically account for risk assessment associated with software being deployed. An update to the source code of an application that is frequently executed in a production environment is not often differentiated from the implementation of a new application that has never been used. Thus, a low risk deployment that may not call for excessive testing or code review and/or approval may incur unnecessary increases in expended pipeline resources as well as total deployment time. Conversely, a high risk deployment that should be accompanied by additional testing and approval may be deployed too quickly, thus exposing production environments to greater chance of application failure.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
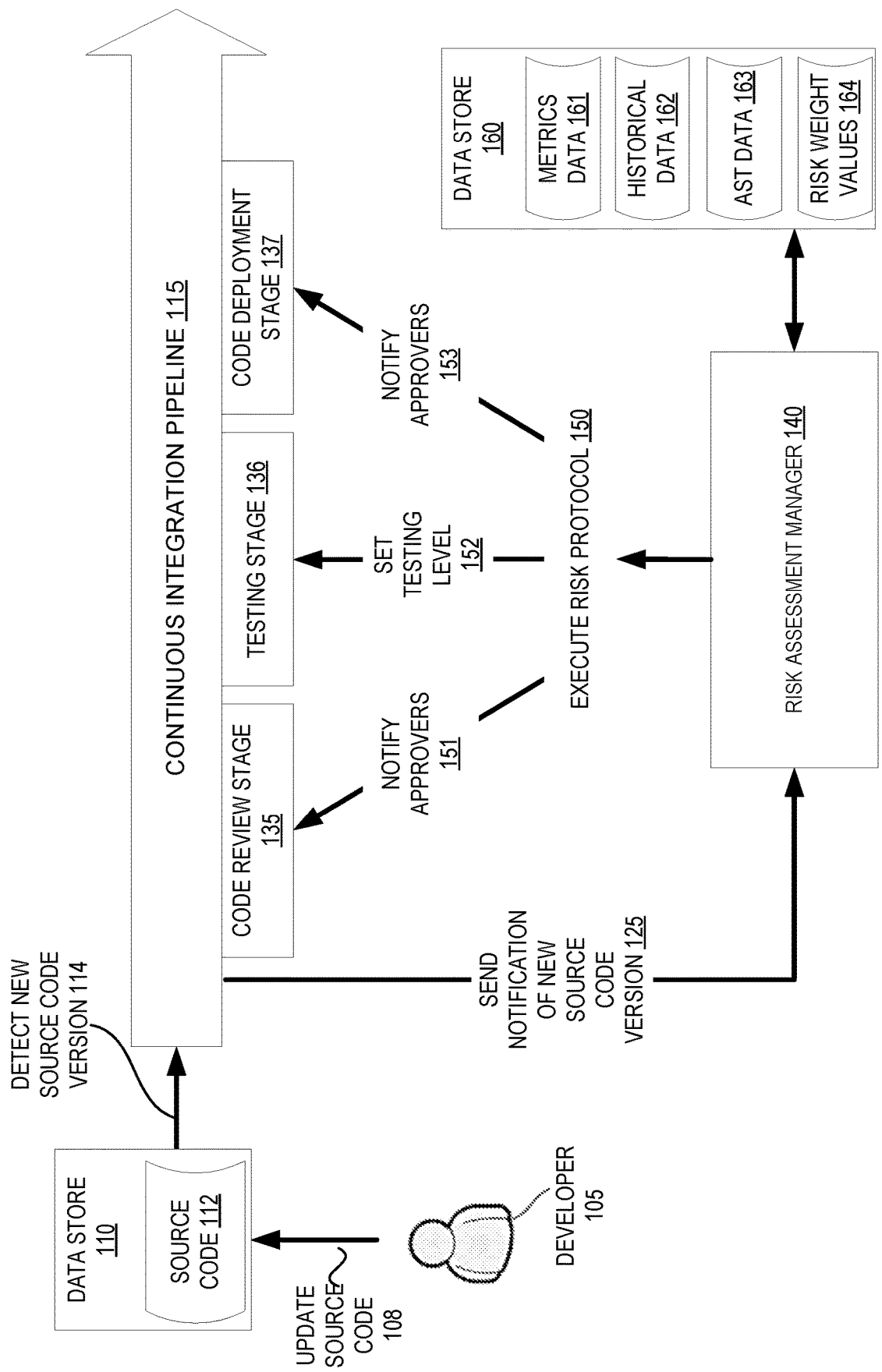
FIG. 1 illustrates an example continuous integration pipeline that includes a risk assessment manager, according to embodiments of the present disclosure.

Embodiments described herein relate to providing automated risk assessment of source code in a software deployment pipeline. In one embodiment, a continuous integration (CI) pipeline includes a risk assessment manager that can analyze new or updated source code for software and provide not only an assessment of the risk of deploying that software, but can additionally provide a modified deployment protocol for the software based on the risk assessment. As source code is added to the pipeline environment, the risk assessment manager can detect the source code and determine the portion of the source code that is different from the version of the source code that is currently deployed in a production environment. The risk assessment manager can then use either statistical probability or captured execution metrics to determine a risk weight value associated with the updated source code. Using this determined risk weight value, the risk assessment manager can determine whether the newly added source code presents a high risk or low risk update to the source code and execute a deployment protocol for the source code based on the determined level of risk. Thus, automated risk assessment within a CI pipeline may implemented to deploy new or updated source code into a production environment in a more cost-effective and resource-efficient manner.

Conventional software deployment systems typically handle risk assessment either manually or not at all. These systems can often rely heavily on manual intervention by risk management personnel to determine the appropriate levels of review and testing that can lead to significant delays in deploying source code to production. Additionally, in many instances, source code is deployed without accounting for risk assessment when determining the levels of review and testing to perform. Thus, more reviewers, testing, and approvals may be performed for a low risk change than would otherwise be prudent. Similarly, fewer reviewers, testing and approvals may be performed for a high risk change than should be adopted. As such, this type code pipeline may cause significant delays in deployment to account for manual intervention and unnecessary review, approval, and testing. Moreover, lack of accurate risk assessment can overburden systems of this type due to inefficient use of available system resources used for testing.

The risk assessment manager of the present disclosure can remedy the above and other deficiencies by automatically determining risk associated with a change to source code to enhance the performance of various change management stages of a CI pipeline. Performance metrics and/or statistical probability of executing an updated portion of the source code may be analyzed to make a risk assessment for the source code that is indicative of how the updated portion may affect the production execution of the program. The risk assessment may then be used to determine the appropriate level of review, testing, and/or approval at various stages of deployment within the CI pipeline. Thus, the risk assessment manager can drive the stages of the CI pipeline in a more efficient manner by eliminating bottlenecks caused by excessive manual intervention and reducing system resources used in unnecessary testing for low risk deployments. Moreover, the performance of a CI pipeline may be further improved by redirecting system resources to software deployments that present the highest risk to production environments. As such, the overall effectiveness and stability of the automated CI pipeline may be dramatically improved for these types of deployments.

FIG. 1 illustrates an example CI pipeline 115 that includes an automated risk assessment manager 140, according to embodiments of the present disclosure. CI is a development practice in which software developers 105 integrate source code 112 with a shared repository (e.g., data store 110) on a regular and/or periodic basis (e.g., several times a day). The data store 110 may be, for example, a Git repository. A CI pipeline is a path or sequence of systems, functions and/or operations associated with CI that are triggered in sequence. Developers check in their source code 112 into the data store 110 (e.g., a "commit"), which is then detected 114 by the CI pipeline 115. Detection of the new source code version 114 by the CI pipeline 115 triggers one or more processes to be performed on that code by the CI pipeline 115. Processes may be triggered in series, so that a next process in the CI pipeline 115 is triggered after a previous process has been successfully completed.

The CI pipeline 115 may be a continuous integration and delivery pipeline. Continuous delivery (CD) is an extension of CI that ensures that every change to the source code is releasable. CD enables new versions of software (e.g., software updates) to be released frequently and easily (e.g., with the push of a button).

In one embodiment, the CI pipeline 115 may include stages that include interaction with change management system resources and personnel to conduct review, testing, and approval. For example, the CI pipeline 115 in FIG. 1 depicts a code review stage 135, a testing stage 135, and a code deployment stage 137. It should be noted that although FIG. 1 illustrates three stages in CI pipeline 115, in other embodiments, CI pipeline 115 may include more stages or fewer stages. Additionally, while the CI pipeline 115 in FIG. 1 depicts the three stages in a particular order, in some implementations, the stages of CI pipeline may be implemented in a different order. For example, additional stages not depicted may be implemented between those stages that are depicted in FIG. 1.

It should also be noted that although FIG. 1 illustrates use of the risk assessment manager 140 with a code pipeline (e.g., CI pipeline 115), in other embodiments the risk assessment manager 140 may be used in conjunction with other systems or services. For example, additional systems or services not depicted may include a dedicated code commit system or service, a dedicated code build system or service, or a dedicated code deployment system or service. Additionally, these dedicated systems/services may comprise components or stages of an enterprise software deployment pipeline. Similarly, the risk assessment manager 140 may be included in software development environments that do not incorporate a software deployment pipeline. In some implementations, the risk assessment manager 140 may be included in a software development workflow that executes of a number of steps or stages before production deployment but that are not part of a defined software deployment pipeline.

In some implementations, a code commit system/service may be a fully-managed source control service that hosts secure source code repositories (e.g., Git-based repositories). A code commit system/service can provide a convenient way for software development teams to collaborate on source code in a secure and highly scalable ecosystem. Additionally, a code commit system/service can provide source control capabilities in an efficient and scalable infrastructure to securely store anything from source code to binaries, working seamlessly with source code repository tools.

In some implementations, a code build system/service may be a fully managed continuous integration service that compiles source code, runs tests, and produces software packages that are ready to deploy. A code build system/service can provide provisioning, managing, and continuous scaling functionality for build servers to facilitate multiple concurrent builds, reducing the number of builds that may be in queue waiting for available resources.

In some implementations, a code deployment system/service may be a fully managed deployment service that automates software deployments to a variety of computing services such as Amazon EC2®, AWS Fargate®, AWS Lambda®, or the like. A code deployment system/service can facilitate the rapid release of new features, reduce and/or eliminate downtime during application deployment, and can manage the complexity of updating applications. A code deployment system/service can also automate software deployments, eliminating the need for error-prone manual operations.

Returning to FIG. 1, Code review stage 135 may be a stage of the pipeline that involves the review of source code by one or more code reviewers prior to the source code being built and staged into a testing environment. In some implementations, a code reviewer may be notified systematically by a process in code review stage 135 when source code is made available for review. The code reviewer may then provide approval systematically as well. Once all specified reviews have been conducted and approvals made, the source code may then proceed to the next stage of the CI pipeline 115.

Testing stage 136 may be a stage that manages all testing of a program before deploying to production. In some implementations, testing stage 136 may be made up of multiple batteries of testing in one or more testing environments. For example, unit testing may be conducted first in a localized environment with a small number of tests conducted. Then, system testing may then be conducted in a larger environment (e.g., beta testing) with additional resources committed to additional test cases. Subsequently, performance testing may then be conducted in an environment that is similar to that of the production environment (e.g., gamma testing, quality assurance (QA) testing, etc.). In some implementations, testing stage 136 may be systematically notified of the level of testing (e.g., number of tests, the number of environments in which to execute a test, the pass rate for test cases, etc.) to perform before allowing the program to proceed to the next stage of CI pipeline 115.

Code deployment stage 137 may be a stage that manages final approval and/or documentation collection requirements for a production deployment. In some implementations, code deployment stage 135 may systematically notify developers of any documentation specifications based on the risk assessment associated with a deployment. For example, high risk deployments may indicate a documented specification to be stored in a change management system that describes the source code change. Additionally, one or more approvers may be notified systematically by a process in code deployment stage 135 when the test results and/or other pertinent information associated with the deployment is made available for review. The approver may then provide approval systematically as well. Once all specified approvers have conducted the approval process and approvals have been made, the source code may then proceed to the next stage of the CI pipeline 115.

In one embodiment, responsive to detecting a new version of source code 112, the CI pipeline 115 can then send a notification of the new source code version 125 to risk assessment manager 140. Risk assessment manager 140 may then, upon detecting the new version of source code 112, retrieve source code 112 and perform automated risk assessment for the new source code version. As discussed in further detail herein, risk assessment manager 140 can analyze the new version of the source code, determine the differences between the new version of the source code and a previous version of the source code, determine a risk weight value associated with the differences, and execute an appropriate deployment protocol based on the determined risk.

In an illustrative example, risk assessment manager 140 may first determine a portion of the new version of source code 112 that includes updates to a previous version. In some implementations, risk assessment manager 140 may make this determination by first generating an abstract syntax tree (AST) for the new version of source code 112. An AST is a tree representation of the abstract syntactic structure of source code 112. Each node of the tree denotes a construct occurring in the source code. The AST is "abstract" in the sense that it does not represent every detail appearing in the source code, but rather just the structural, content-related details. For example, an if-then-else expression with three conditional statements may be represented using a node with three branches (one for each statement).

Risk assessment manager 140 may store the new AST for source code 112 in AST data 163 of data store 160. In some implementations, the new AST can be stored with a unique identifier so that it can be readily identified as associated with the new source code version. For example, the new AST can be stored with the same identifier used when the developer 105 updates the source code (e.g., the "commit" identifier associated with update source code 108).

Risk assessment manager 140 may then determine the portion of the new version of the source code that includes one or more updates to a previous version of the source code. In some implementations, risk assessment manager 140 may make this determination by comparing the new AST to an AST associated with the previous version of the source code to identify branches of the new AST that represent the updates to the source code. Risk assessment manager 140 may retrieve the previous AST from AST data 163 using the unique identifier associated with the previous version of the source code.

Risk assessment manager 140 may then determine a risk weight value associated with the one or more updates. Risk assessment manager 140 can determine risk weight values for each updated branch of the new AST and calculate a total risk weight value for the updated source. In some implementations, risk assessment manager 140 can utilize a static method for determining the risk weight values. In such instances, risk assessment manager 140 can assign risk weights to branches of the AST based on the statistical probability of executing the particular branches of the AST. For example, if a section of AST includes four branches, each branch may be assigned an equal risk weight value based on the assumption that each branch has an equal probability of being executed (e.g., 25% probability). Alternatively, if three of the four branches are most likely to be executed, while the fourth branch represents a catch-all (e.g., a default assignment if none of the other three branches are executed), the first three branches might be assigned a 33% risk weight value, while the catch-all branch might be assigned a 1% risk weight value.

In some implementations, risk assessment manager 140 can utilize a dynamic method for determining the risk weight values. In these instances, risk assessment manager 140 may access captured execution metrics associated with the updated branch(es) of the new AST and/or the remaining branches of the new AST. For example, the captured execution metrics can include the number of executions of the program that are attributable to the updated branch of the new AST (which corresponds to a branch of the original AST and has execution metrics) and the total number of executions of the program and/or number of executions attributable to one or more other branches of the AST. Risk assessment manager 140 can retrieve this information from metrics data 161 of data store 160. Risk assessment manager 140 can then calculate the percentage of program executions attributable to the updated branch of the new AST as compared to other branches of the new AST to determine the risk weight value for the updated branch. For example, if the updated section of the new AST includes four branches where production metrics associated with the previous version of the source code indicate that one branch executes 80% of the time, then that branch can be assigned a risk weight value of 80%.

In some implementations, risk assessment manager 140 may use a combination of the static and dynamic methods to determine the risk weight values. For example, an entirely new program or an entirely new branch of code in an existing program may not have any captured execution metrics. In such cases, risk assessment manager 140 may initially use a static method to determine the risk weight value, then update it for future releases once execution metrics have been captured.

Risk assessment manager 140 may also use additional historical information stored in historical data 162 of data store 160 to calculate the risk weight value. In some implementations, risk assessment manager 140 may increase or decrease the risk weight value based on additional factors such as the development history of a particular developer (e.g., the number of bugs generated by a particular developer), the history of the particular source code (e.g., the number of times an update for a particular program has been rolled back), the risk associated with a particular system (e.g., purchasing vs. browsing), or other similar information. For example, if an updated branch of the new AST has been assigned a low risk weight value based on execution metrics, risk assessment manager 140 may increase the risk weight value for the updated branch if the developer who updated the source code is a junior developer and/or one who has a poor track record. Similarly, if an updated branch has been assigned a higher risk weight value based on execution metrics, risk assessment manager 140 may decrease the risk weight value for the updated branch if the developer who updated the source is a senior developer and/or has a record indicating very few errors.

Once the risk weight value for the updated branch has been determined, risk assessment manager 140 can then store the information in data store 160 for future use. In some implementations, the risk weight value(s) may be stored with the AST data. Alternatively, the risk weight value(s) may be stored separately (e.g., risk weight values 164 of data store 160). In this latter case, the risk weight value may be stored with an identifier associated with its corresponding AST branch.

Risk assessment manager 140 may then determine whether the calculated risk weight value for the new AST meets or exceeds a threshold value. In some implementations, the threshold value may be predetermined based on acceptable levels of risk associated with a particular program, sub-system, business group, etc. For example, a critical part of the system may have a lower predetermined threshold value because the system overall is more risk-averse. Conversely, a portion of the system that does not receive as much traffic overall may have a higher predetermined threshold value because riskier deployments can be mitigated more easily due to the lack of traffic.

Risk assessment manager 140 may then execute a risk deployment protocol 150 based on whether the risk weight value meets or exceeds the threshold value. In some implementations, executing the risk deployment protocol 150 can send notifications to reviewers and approvers as well as set levels of testing within the CI pipeline 115. As shown in FIG. 1, executing the risk protocol 150 can include notifying reviewers 151 to review code during code review stage 135. Additionally, executing risk protocol 150 can set testing level 152 to set the number of tests, the code coverage for each test (e.g., the total amount of source code 112 tested during any particular test), and set the number of test phases (e.g., unit, beta, gamma, etc.) for testing stage 136. Moreover, executing risk protocol 150 can notify approvers 153 (e.g., senior developers, group managers, etc.) to review and approve code during code deployment stage 137.

If the risk weight value meets or exceeds the threshold, risk assessment manager 140 can execute a high risk deployment protocol that may specify additional code reviewers for code review stage 135, additional testing for testing stage 136, and additional approvers for code deployment stage 137. Conversely, if the risk weight value does not meet the threshold, risk assessment manager 140 can execute a low risk deployment protocol that may specify fewer code reviewers for code review stage 135, less testing for testing stage 136, and fewer approvers for code deployment stage 137.

Risk assessment manager 140 is described in additional detail below with respect to FIG. 2

Figure 2:
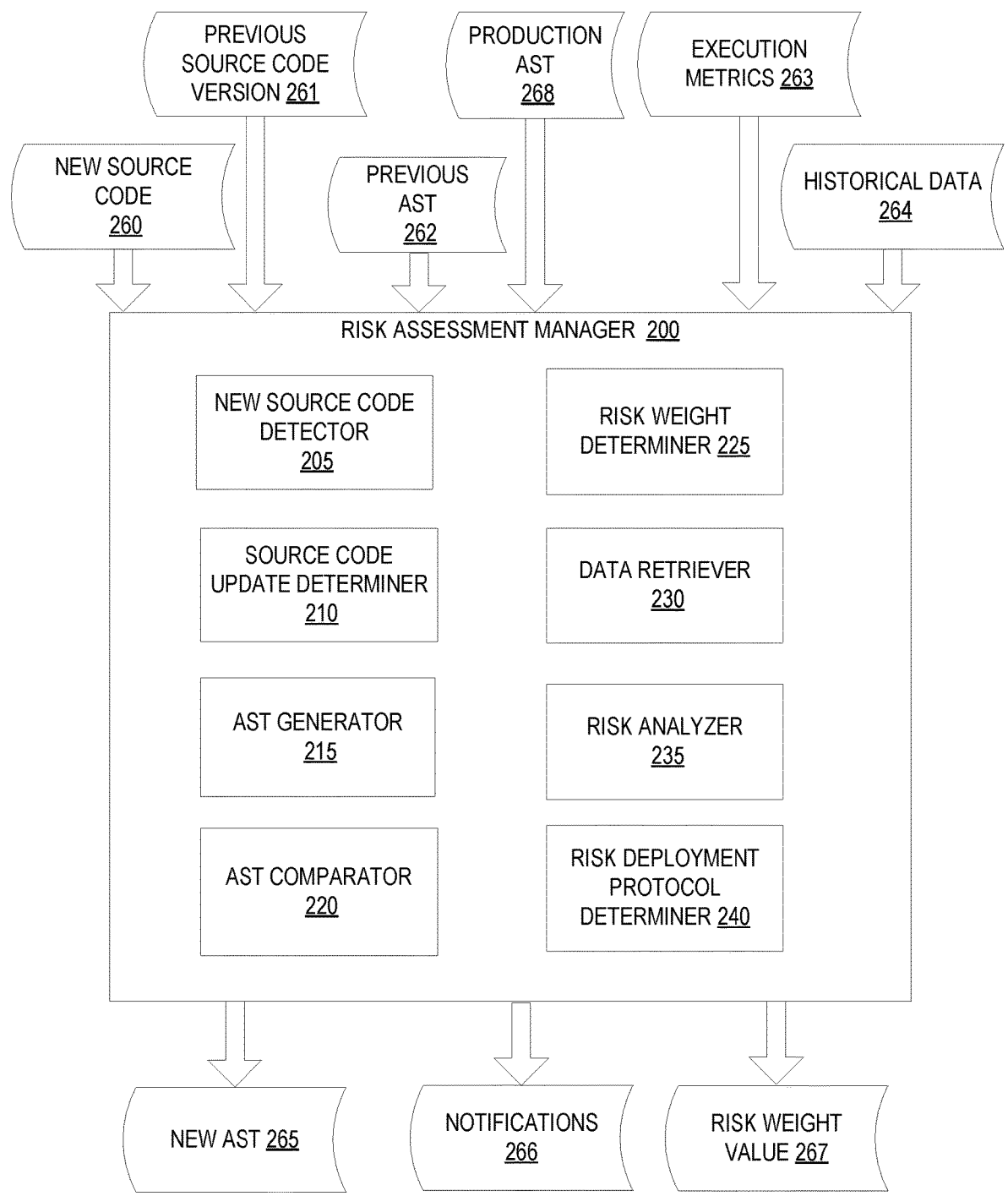
FIG. 2 is a block diagram of a logical view of a risk assessment manager, in accordance with one embodiment of the present disclosure.

FIG. 2 is a block diagram of a logical view of a risk assessment manager 200, in accordance with one embodiment of the present disclosure. Risk assessment manager 200 may correspond to the risk assessment manager 140 of FIG. 1. In some embodiments, risk assessment manager 200 may include new source code detector 205, source code update determiner 210, AST generator 215, AST comparator 220, risk weight determiner 225, data retriever 230, risk analyzer 235, and risk deployment protocol determiner 240.

Risk assessment manager 200 may invoke new source code detector 205 to detect that a new version of source code for a program is available to be deployed by a software deployment pipeline (e.g., a CI pipeline). In some implementations, new source code detector 205 may be invoked upon receiving a notification from the CI pipeline that the new source code (e.g., new source code 260) has been added (e.g., via a Git "commit" command) to the CI pipeline. Alternatively, new source code detector 205 may be implemented as a long running task that continuously monitors the CI pipeline to detect when the new source code has been added.

Source code update determiner 210 may then be invoked to determine a portion of the new version of the source code that includes one or more updates to a previous version of the source code (e.g., previous source code version 261). In some implementations, an update can include a portion of previous source code version 261 that has been modified. Alternatively, or additionally, an update can include an entirely new portion of new source code 260 that was not present in previous source code version 261. Source code update determiner 210 may make this determination by generating a new AST (e.g., new AST 265) for the new source code 260 and comparing it to a previous version of the AST (e.g., previous AST 262, or production AST 268) for the source code. Accordingly, an update can include a portion of new AST 265 that identifies a modification of a corresponding portion of previous AST 262 (or production AST 268), and/or an entirely new branch of a new AST 265 that was not present in previous AST 262 (or production AST 268).

As noted above, an AST is an abstract syntactic structure of source code. Source code update determiner 210 can retrieve new source code 260 from a data store and invoke AST generator 215 to generate the new AST 265. AST generator 215 may analyze new source code 260 to identify each logic branch indicating a unique logic path, generate a unique identifier for each branch of the AST, and store the new AST 265 in a data store. The new AST 265 may be stored with an AST identifier associated with the new source code 260. For example, the AST identifier may be a hashed identifier that includes the commit identifier or build identifier for the new source code 260. In some implementations, the branch identifiers may be assigned to each branch of the AST to specifically identify particular logic paths within the AST. The branch identifiers for each branch of the AST can then be stored for later use with metrics capture and analysis to assist with risk assessment as described in further detail below.

Source code update determiner 210 may then identify a previous AST (e.g., previous AST 262) that is associated with a previous version of the source code (e.g., previous source code version 261). In some implementations, source code update determiner 210 may determine the identifier associated with previous source code version 261 (e.g., the commit identifier used when deploying previous source code version 261) and access an AST data store to obtain previous AST 261. Source code update determiner 210 may then invoke AST comparator 220 to compare new AST 265 to previous AST 262 to identify a difference between new AST 265 and previous AST 262. In some implementations, the difference can include a branch of new AST 265 that represents an update to previous source code version 261.

In some implementations, AST comparator 220 may identify multiple differences between new AST 265 and previous AST 262. In such cases, AST comparator 220 can identify an additional difference between new AST 265 and previous AST 262 where the additional difference includes an additional branch of the new AST 265 that represents an additional update to previous source code version 261. If multiple differences are identified, each difference may contribute to an overall risk assessment for the new source code 260.

In some implementations, several different versions of the source code may be present in the CI pipeline concurrently. For example, a first set of code updates may be stage of the pipeline that is nearing production deployment whereas a second set of code updates may be newly added to an earlier stage of the pipeline (e.g., code review, testing, etc.). In such cases, the source code update determiner 210 and AST comparator 220 may compare the new AST 265 for the second set of code updates against the production AST 268 (e.g., the AST associated with the code deployed in production) rather than the previous AST 262 that may be associated with the first set of code updates that have not yet been deployed. Thus, the updates can be determined relative to the code deployed in production rather than relative to the code that is still within the deployment pipeline but not yet deployed.

Risk weight determiner 225 may then be invoked to determine a risk weigh value associated with the updates identified by source code update determiner 210. Risk weight determiner 225 can determine risk weight values for each updated branch of the new AST 265 and calculate a total risk weight value for the updated source code 260. In some implementations, as noted above with respect to FIG. 1, risk weight determiner 225 can utilize a static method for determining the risk weight values. In such instances, risk weight determiner 225 can assign risk weights to branches of new AST 265 based on the statistical probability of executing the particular branches of the AST. For example, risk weight determiner 225 can determine a total number of branches included in new AST 265, and then determine a statistical probability of executing the updated branch of new AST 265 based at least in part on the total number of branches. Risk weight determiner 225 can then determine the risk weight value for the new branch of new AST 265 using the determined statistical probability.

In some implementations, as noted above with respect to FIG. 1, risk weight determiner 225 can utilize a dynamic method for determining the risk weight values. In these instances, risk weight determiner 225 may access captured execution metrics 263 associated with the updated branch (es) of the new AST 265. For example, the captured execution metrics 263 can include the number of executions of the program that are attributable to the updated branch of the new AST 265, the system resources used by the program (e.g., memory, CPU, execution time, data input/output operations, etc.), or other similar information. Execution metrics 263 may be captured at execution time by including additional function calls ("hooks") in each branch of the source code to capture the particular execution metrics as well as an identifier associated with the branch of the source code. Thus, metrics may be captured and aggregated for particular branches of the program.

Risk weight determiner 225 can first determine the unique identifier associated with the updated branch of new AST 265, and then invoke data retriever 230 to retrieve execution metrics 263 associated with the unique identifier. In an illustrative example, risk weight determiner 225 can then calculate the percentage of program executions attributable to the updated branch of the new AST as compared to other branches of the new AST to determine the risk weight value for the updated branch based on the captured execution metrics. Risk weight determiner 225 can determine the risk weight value for the updated branch based on the determined percentage.

In some implementations, as noted above with respect to FIG. 1, risk weight determiner 225 may use a combination of the static and dynamic methods to determine the risk weight values. For example, an entirely new program or an entirely new branch of code in an existing program may not have any captured execution metrics. In such cases, risk weight determiner 225 may initially use a static method to determine the risk weight value, then update it for future releases of the source code once execution metrics have been captured. In some implementations, risk weight determiner 225 may use the static method until the amount of captured metrics for the updated branch have met a minimum threshold (e.g., a particular number of program executions attributable to the branch). Once the threshold has been met, the dynamic method may then be used. Similarly, if metrics have been captured for some branches but not others, risk weight determiner 225 can utilize the metrics for those branches that have captured metrics and utilize the static method for those branches without captured metrics.

In some implementations, as noted above with respect to FIG. 1, risk weight determiner 225 may utilize additional stored historical deployment metadata (e.g., historical data 264) to calculate the risk weight value. In such cases, risk weight determiner 225 may increase or decrease the risk weight value based on additional factors. For example, even if captured metrics indicate low traffic, risk weight determiner 225 can increase the risk weight value if the branch of the source code completes riskier operations or the developer has a poor deployment track record.

Risk weight determiner 225 can invoke data retriever 230 to identify and retrieve the historical deployment metadata (e.g., historical data 264) associated with the previous source code version 261. In some implementations, historical data 264 can include the failure rate associated with a particular software developer (e.g., the number of bugs generated by a particular developer), the failure rate of the previous source code version 261 (e.g., the number of times an update to a particular program has been rolled back), the risk assessment data associated with a particular subsystem for the previous source code version 261 (e.g., purchasing vs. browsing), the sensitivity rating of information accessible to the previous source code version 261 (e.g., sensitive data vs. non-sensitive data), and/or other similar information.

Risk weight determiner 225 can then determine a risk multiplier associated with the retrieved historical metadata, and determine an updated risk weight value by applying the risk multiplier to the risk weight value. For example, if an updated branch of new AST 265 has been assigned a low risk weight value based on execution metrics, risk weight determiner 225 may increase the risk weight value for the updated branch if the developer who updated the source code is a more junior developer or has a poor track record. Similarly, if an updated branch has been assigned a higher risk weight value based on execution metrics, risk weight determiner 225 may decrease the risk weight value for the updated branch if the developer who updated the source has a better track record.

Similarly, risk weight determiner 225 may utilize additional stored historical performance data (e.g., historical data 264) to calculate the risk weight value. In such cases, risk weight determiner 225 may increase or decrease the risk weight value based on additional performance related factors. For example, even if captured metrics indicate low traffic, risk weight determiner 225 can increase the risk weight value if the branch of the source code may have a negative impact on system resources and/or involves security and/or financial transactions.

Risk weight determiner 225 can invoke data retriever 230 to identify and retrieve the historical performance metadata (e.g., historical data 264) associated with the previous source code version 261. In some implementations, the historical performance metadata can include the CPU utilization rate of the previous version of the software, a memory usage rate of the previous version of the software, or the like.

Risk weight determiner 225 can then determine the risk multiplier associated with the retrieved historical performance metadata, and determine an updated risk weight value by applying the risk multiplier to the risk weight value. For example, if CPU utilization is historically high for the program and the updated branch includes additional CPU intensive activities or uses additional memory resources, risk weight determiner 225 can increase the risk weight value associated with the updated branch of the new source code 260.

In some implementations, risk weight determiner 225 may combine the risk weights of all updated branches of the new AST 265. In such cases risk weight determiner 225 may repeat the above process to determine any additional differences between new AST 265 and previous AST 262. Risk weight determiner may then determine additional risk weight values for any additional updated branches. Subsequently, risk weight determiner may determine a combined risk weight value by combining the risk weight values for all updated branches. In some implementations, the combined risk weight value may be determined by adding all the risk weight values together. Alternatively, the combined risk weight value may be determined using a function of all the risk weight values (e.g., applying a different multiplier to the risk weight value for each branch and summing the results).

Once the combined risk weight value for all updated branches have been determined, risk weight determiner 225 can then store the final risk weight value (e.g., risk weight value 267) in a data store for future use. In some implementations, the risk weight value(s) 267 may be stored with new AST 265. Alternatively, the risk weight value(s) 267 may be stored separately. In this latter case, the risk weight value(s) 267 may be stored with an identifier associated with its corresponding branch in new AST 265.

Risk analyzer 235 may then be invoked to determine whether the calculated risk weight value 267 for new AST 265 meets a threshold value. In some implementations, the threshold value may be predetermined based on acceptable levels of risk associated with a particular program, subsystem, business group, etc. For example, a critical part of the system may have a lower predetermined threshold value because the system overall is more risk-averse. Conversely, a portion of the system that does not receive as much traffic overall may have a higher predetermined threshold value because riskier deployments can be mitigated more easily due to the lack of traffic.

Responsive to determining that the risk weight value meets the predetermined threshold value, risk deployment protocol determiner 240 may then be invoked to execute a high risk deployment protocol. In some implementations, a high risk deployment protocol may specify additional code reviewers for a code review stage of the CI pipeline, additional testing for testing stage of the CI pipeline, and/or additional approvers for code deployment stage of the CI pipeline. In some implementations, risk deployment protocol determiner 240 may send alerts (e.g., notifications 2665) to subsystems that are associated with various stages of the CI pipeline. Alternatively, risk deployment protocol determiner 240 may send alerts (e.g., notifications 266) and/or risk weight value 267 to a central change management subsystem that controls change management activities for all stages of the CI pipeline.

In an illustrative example, risk deployment protocol determiner 240 may increase the number of specified code review approvals to compete a code review stage of the CI pipeline. In some implementations, risk deployment protocol determiner 240 may determine a first number of specified code review approvals that represents the currently assigned number of approvals associated with the source code. Risk deployment protocol determiner 240 may then increase the first number of specified code review approvals to a second number of specified code review approvals to complete the code review stage, where the second number is greater than the first number. For example, if the current number of code review approvals is two (e.g., two code reviewers should approve the changes to the source code for it to complete the code review stage), risk deployment protocol determiner 240 may increase the number to a number higher than two (e.g., three, four, etc.).

Risk deployment protocol determiner 240 may then determine identities for the specified code review approvals. In some implementations, risk deployment protocol determiner 240 can select code review approvers from a list of designated approvers. In some implementations, risk deployment protocol determiner 240 access a data store or a change management subsystem to identify profile information associated with designated code review approvers for the CI pipeline. Risk deployment protocol determiner 240 can select the code review approvers randomly, alphabetically, based on subsystem, or in any similar manner. Additionally, risk deployment protocol determiner 240 may select the specified code review approvers for a high risk deployment protocol based on experience level. For example, at least one senior developer might be selected for code review approval in a high risk deployment protocol. Risk deployment protocol determiner 240 can then send a notification 266 to the specified code review approvers.

Risk deployment protocol determiner 240 may also increase the number of specified code deployment approvals to compete a code deployment stage of the CI pipeline. For example, a high risk deployment protocol can specify manager approval of the source code changes to allow the deployment of the program into a production environment. In some implementations, risk deployment protocol determiner 240 may determine a first number of specified code deployment approvals that represents the currently assigned number of approvals associated with deploying the source code. Risk deployment protocol determiner 240 may then increase the first number of specified code deployment approvals to a second number of specified code deployment approvals to complete the code deployment stage, where the second number is greater than the first number. For example, if the current number of code deployment approvals is one (e.g., only one approver should approve the deployment of the source code), risk deployment protocol determiner 240 may increase the number to a number higher than one (e.g., two, three, four, etc.).

Risk deployment protocol determiner 240 may then determine identities for the specified code review approvals in a manner similar to that described above. In some implementations, risk deployment protocol determiner 240 can select deployment approvers from a list of designated approvers. In some implementations, risk deployment protocol determiner 240 access a data store or a change management subsystem to identify profile information associated with designated deployment approvers for the CI pipeline. Risk deployment protocol determiner 240 can select the deployment approvers randomly, alphabetically, based on subsystem, or in any similar manner. Risk deployment protocol determiner 240 can then send a notification 266 to the specified deployment approvers.

Risk deployment protocol determiner 240 may also increase an amount of specified testing to perform to complete a testing stage of the CI pipeline. For example, a high risk deployment protocol may specify additional test cases, additional test stages (e.g., unit, beta, gamma, etc.), additional code coverage (e.g., the percentage of code branches tested for a particular program), etc. In some implementations, risk deployment protocol determiner 240 can send a notification 266 to a testing subsystem to automatically set the specific parameters for testing new source 260. Alternatively, risk deployment protocol determiner 240 may include the risk weight value 267 in notification 266, allowing the testing subsystem to set the level of testing independently based on the risk weight value 267.

Responsive to determining that the risk weight value does not meet the predetermined threshold value, risk deployment protocol determiner 240 may be invoked to execute a low risk deployment protocol. In some implementations, a low risk deployment protocol may specify fewer code reviewers for a code review stage of the CI pipeline, less testing for testing stage of the CI pipeline, and fewer approvers for code deployment stage of the CI pipeline. In some implementations, risk deployment protocol determiner 240 may send alerts (e.g., notifications 266) to subsystems that are associated with various stages of the CI pipeline. Alternatively, risk deployment protocol determiner 240 may send alerts (e.g., notifications 266) and/or risk weight value 267 to a central change management subsystem that controls change management activities for all stages of the CI pipeline.

In an illustrative example, risk deployment protocol determiner 240 may decrease a number of specified code review approvals to compete a code review stage of the CI pipeline. In some implementations, risk deployment protocol determiner 240 may determine a first number of specified code review approvals that represents the currently assigned number of approvals associated with the source code. Risk deployment protocol determiner 240 may then decrease the first number of specified code review approvals to a second number of specified code review approvals to complete the code review stage, where the second number is less than the first number. For example, if the current number of code review approvals is two (e.g., two code reviewers should approve the changes to the source code for it to complete the code review stage), risk deployment protocol determiner 240 may increase the number to a number lower than two (e.g., one, none.).

Risk deployment protocol determiner 240 may then determine identities for the specified code review approvals in the fashion described above. Risk deployment protocol determiner 240 can then send a notification 266 to the specified code review approvers.

Risk deployment protocol determiner 240 may also decrease a number of specified code deployment approvals to compete a code deployment stage of the CI pipeline. For example, a low risk deployment protocol may specify that only a single manager approval of the source code changes is needed to allow the deployment of the program into a production environment. Alternatively, a low risk deployment protocol may not need a manager approval at all, and may only specify that the approval of a senior level developer is sufficient.

In some implementations, risk deployment protocol determiner 240 may determine a first number of specified code deployment approvals that represents the currently assigned number of approvals associated with deploying the source code. Risk deployment protocol determiner 240 may then decrease the first number of specified code deployment approvals to a second number of specified code deployment approvals to complete the code deployment stage, where the second number is less than the first number. For example, if the current number of code deployment approvals is two (e.g., two approver should approve the deployment of the source code), risk deployment protocol determiner 240 may decrease the number to a number less than two (e.g., one, none.).

Risk deployment protocol determiner 240 may then determine identities for the specified code review approvals in a manner similar to that described above. Risk deployment protocol determiner 240 can then send a notification 266 to the specified deployment approvers.

Risk deployment protocol determiner 240 may also decrease an amount of testing to complete a testing stage of the CI pipeline. For example, a low risk deployment protocol may specify fewer test cases, fewer test stages (e.g., unit, beta, gamma, etc.), less code coverage (e.g., the percentage of code branches tested for a particular program), etc. In some implementations, risk deployment protocol determiner 240 can send a notification 266 to a testing subsystem to automatically set the specific parameters for testing new source 260. Alternatively, risk deployment protocol determiner 240 may include the risk weight value 267 in notification 266, allowing the testing subsystem to set the level of testing independently based on the risk weight value 267.

FIGS. 3-7 are flow diagrams showing various methods for performing automated risk assessment of source code, in accordance with embodiments of the disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by one or more computing devices executing components of a risk assessment manager. In one implementation, the methods may be performed by risk assessment manager 140 of FIG. 1, and/or brand risk assessment manager 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 3:
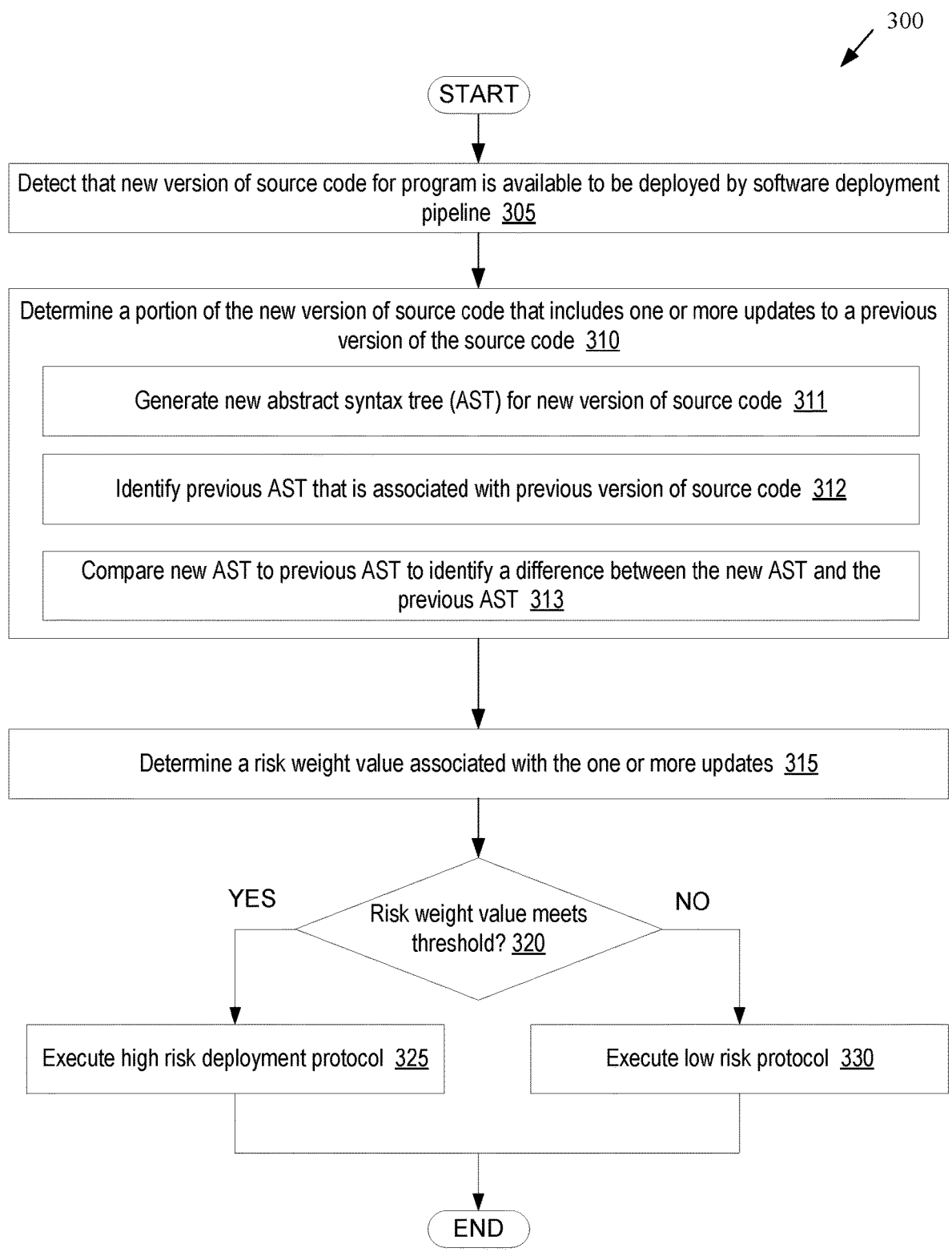
FIG. 3 depicts a flowchart illustrating one embodiment for a method of performing automated risk assessment.

FIG. 3 depicts a flowchart illustrating one embodiment for a method 300 of performing automated risk assessment. At block 305 of method 300, processing logic detects that a new version of source code for a program is available to be deployed by a software deployment pipeline. At block 310, processing logic determines a portion of the new version of source code that includes one or more updates to a previous version of the source code. In some implementations, processing logic can make this determination by further executing blocks 311-313.

At block 311, processing logic generates a new abstract syntax tree (AST) for the new version of the source code. At block 312, processing logic identifies a previous AST that is associated with a previous version of the source code. At block 313, processing logic compares the new AST to the previous AST to identify a difference between the new AST and the previous AST.

At block 315, processing logic determines a risk weight value associated with the one more updates determined at block 310. In some implementations, processing logic can determine the risk weight value based on static information. Determining a risk weight value in this manner is described below with respect to FIG. 4. In some implementations, processing logic can determine the risk weight value based on dynamically captured execution metrics. Determining a risk weight value in this manner is described below with respect to FIG. 5.

At block 320, processing logic determines whether the risk weight value determined at block 315 meets a threshold value. If so, processing proceeds to block 325. At block 325, processing logic executes a high risk deployment protocol for the new version of the source code within the software deployment pipeline. After block 325, the method of FIG. 3 terminates.

If at block 320, processing logic determines that the risk weight value does not meet the threshold value, processing proceeds to block 330. At block 330, processing logic executes a low risk deployment protocol for the new version of the source code within the software deployment pipeline. After block 330, the method of FIG. 3 terminates.

Figure 4:
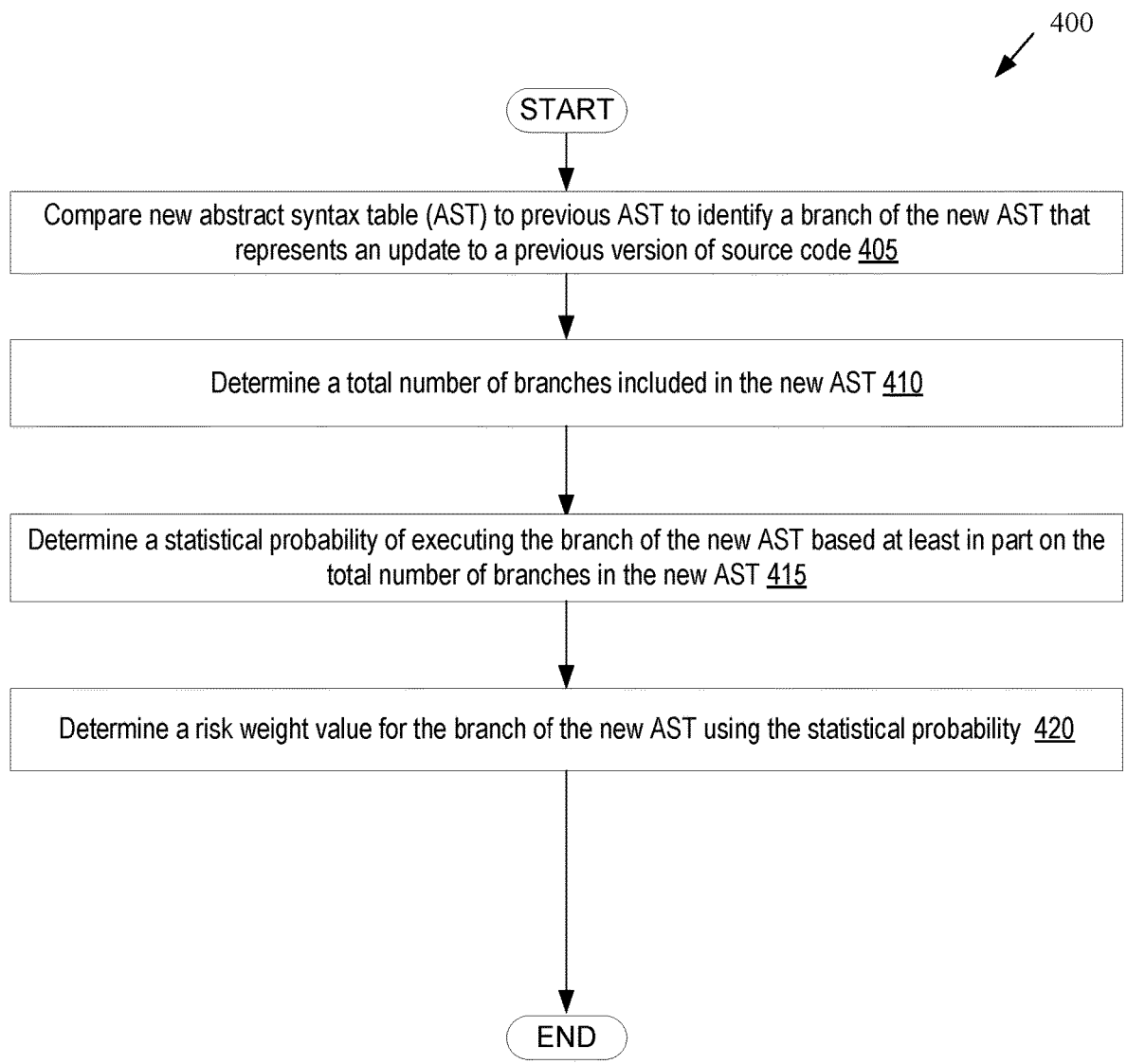
FIG. 4 depicts a flowchart illustrating one embodiment for a method of determining a risk weight value for updated source code based on static information.

FIG. 4 depicts a flowchart illustrating one embodiment for a method 400 of determining a risk weight value for updated source code based on static information. At block 405 of method 400, processing logic compares a new abstract syntax table (AST) to a previous AST to identify a branch of the new AST that represents an update to a previous version of source code. At block 410, processing logic determines a total number of branches included in the new AST. At block 415, processing logic determines a statistical probability of executing the branch of the new AST based at least in part on the total number of branches in the new AST. At block 420, processing logic determines a risk weight value for the branch of the new AST using the statistical probability. After block 420, the method of FIG. 4 terminates.

Figure 5:
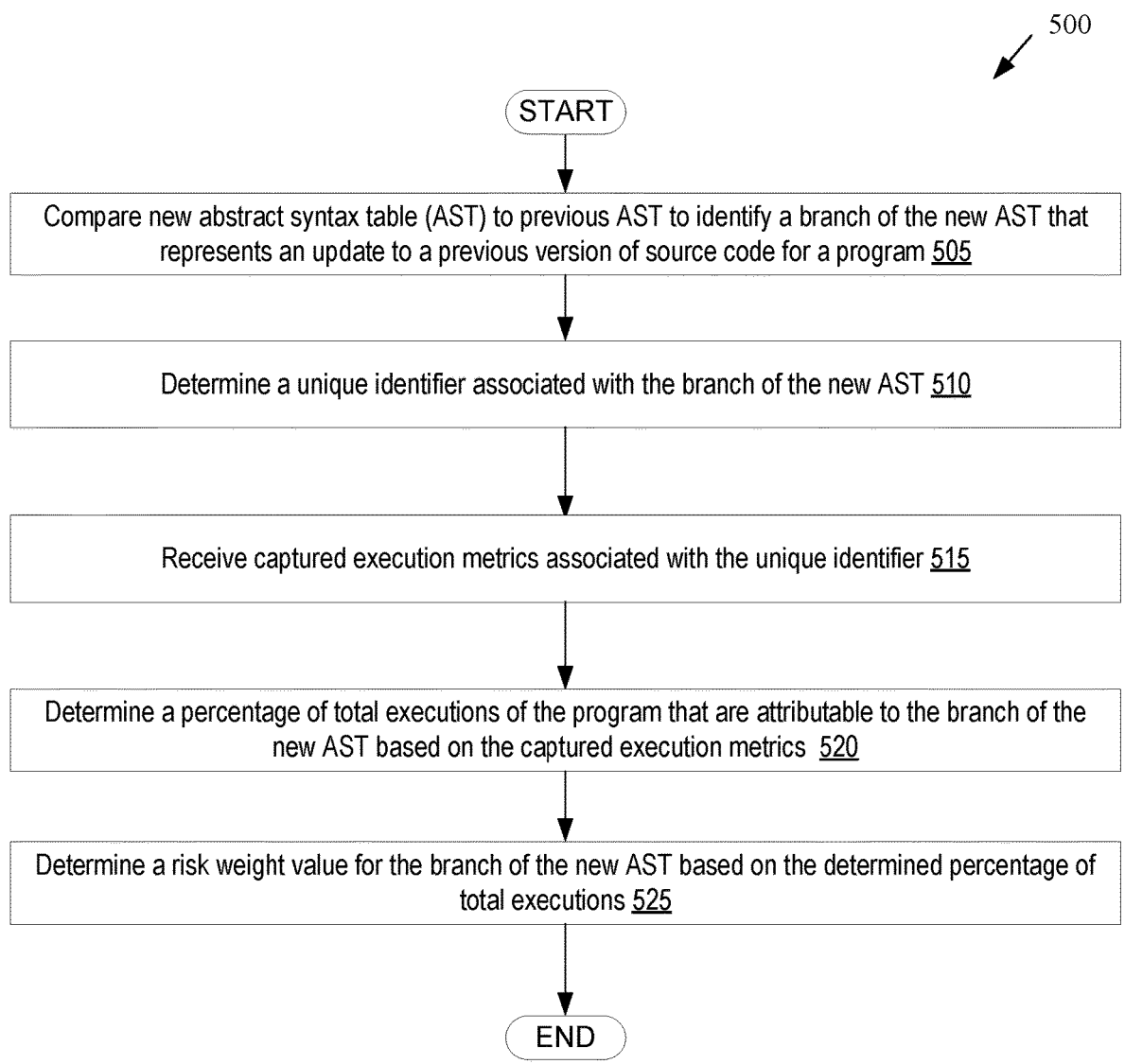
FIG. 5 depicts a flowchart illustrating one embodiment for a method of determining a risk weight value for updated source code based on dynamically captured execution metrics.

FIG. 5 depicts a flowchart illustrating one embodiment for a method 500 of determining a risk weight value for updated source code based on dynamically captured execution metrics. At block 505 of method 500, processing logic compares a new abstract syntax table (AST) to a previous AST to identify a branch of the new AST that represents an update to a previous version of source code. At block 510, processing logic determines a unique identifier associated with the branch of the new AST. At block 515, processing logic receives captured execution metrics associated with the unique identifier. At block 520, processing logic determines a percentage of total executions of the program that are attributable to the branch of the new AST based on the captured execution metrics. At block 525, processing logic determines a risk weight value for the branch of the new AST based on the determined percentage of total executions. After block 525, the method of FIG. 5 terminates.

Figure 6:
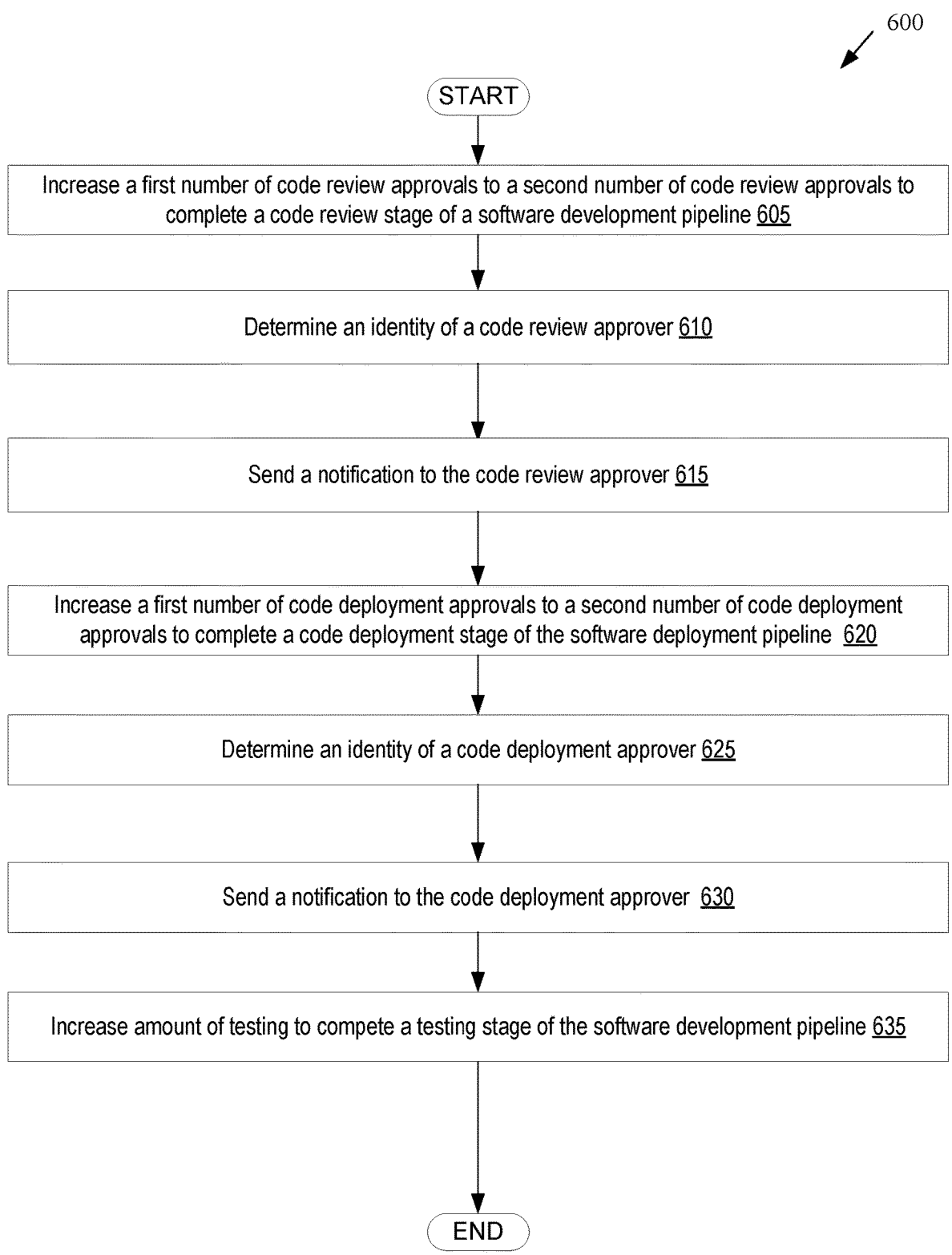
FIG. 6 depicts a flowchart illustrating one embodiment for a method of executing a high risk deployment protocol.

FIG. 6 depicts a flowchart illustrating one embodiment for a method 600 of executing a high risk deployment protocol. At block 605 of method 600, processing logic increases a first number of code review approvals to a second number of code review approvals to complete a code review stage of a software development pipeline, where the second number is greater than the first number. In some implementations, processing logic can determine a first number specified code review approvals that represents the currently assigned number of approvals associated with the source code. Processing logic may then increase the first number of specified code review approvals to a second number of specified code review approvals to complete the code review stage, where the second number is greater than the first number. For example, if the current number of code review approvals is two (e.g., two code reviewers should approve the changes to the source code for it to complete the code review stage), processing logic may increase the number to a number higher than two (e.g., three, four, etc.).

At block 610, processing logic determines the identity of a code review approver. At block 615, processing logic sends a notification to the code review approver.

At block 620, processing logic increases a first number of code deployment approvals to a second number of code deployment approvals to complete a code deployment stage of the software development pipeline, where the second number is greater than the first number. In some implementations, processing logic may determine a first number of specified code deployment approvals that represents the currently assigned number of approvals associated with deploying the source code. Processing logic may then increase the first number of specified code deployment approvals to a second number of specified code deployment approvals to complete the code deployment stage, where the second number is greater than the first number. For example, if the current number of code deployment approvals is one (e.g., only one approver should approve the deployment of the source code), processing logic may increase the number to a number higher than one (e.g., two, three, four, etc.).

At block 625, processing logic determines the identity of a code deployment approver. At block 630, processing logic sends a notification to the code deployment approver. At block 635, processing logic increases an amount of testing to complete a testing stage of the software development pipeline. After block 635, the method of FIG. 6 terminates.

Figure 7:
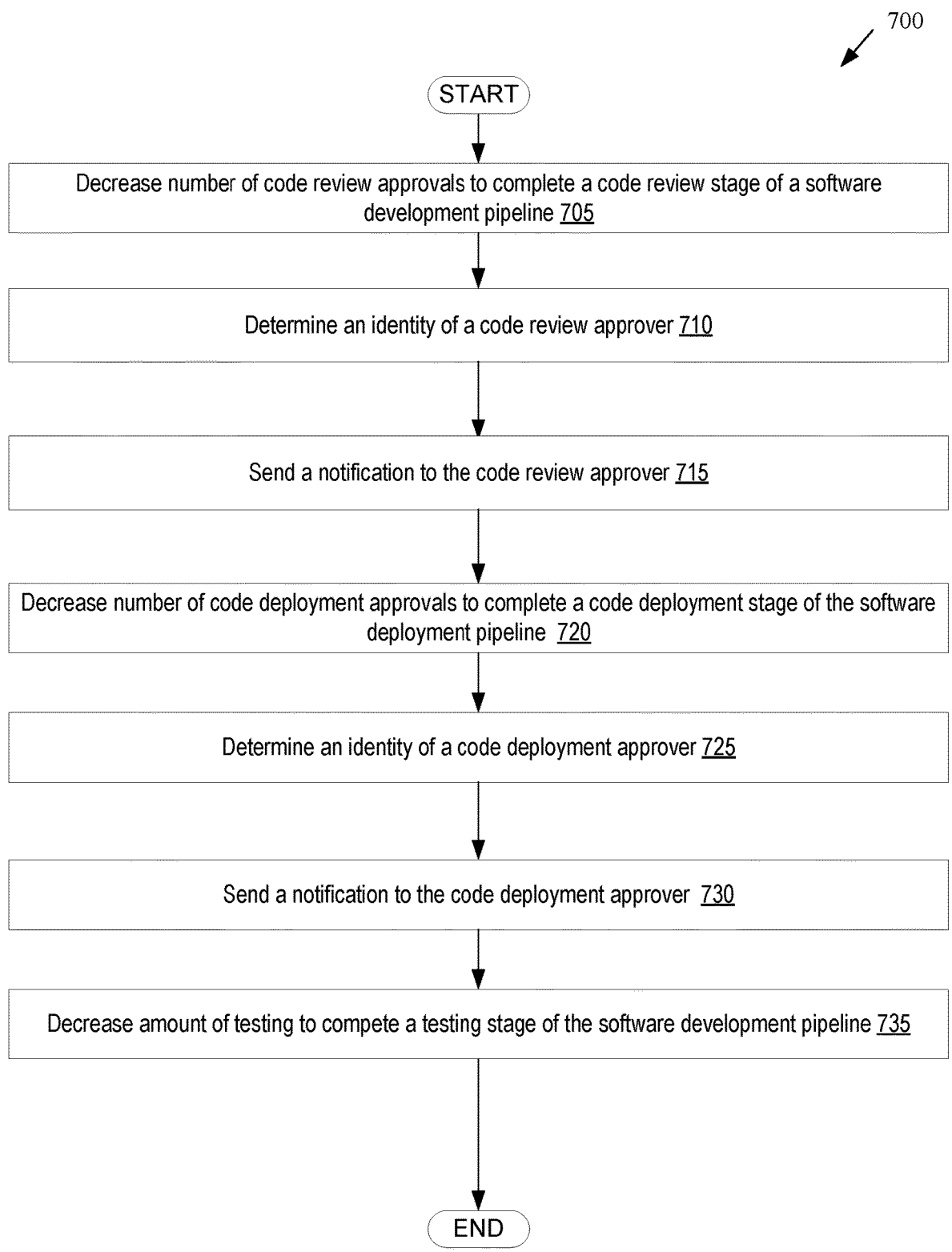
FIG. 7 depicts a flowchart illustrating one embodiment for a method of executing a low risk deployment protocol.

FIG. 7 depicts a flowchart illustrating one embodiment for a method 700 of executing a low risk deployment protocol. At block 705 of method 700, processing logic decreases a first number of specified code review approvals to a second number of specified code review approvals to complete a code review stage of a software development pipeline, where the second number is less than the first number. In some implementations, processing logic may determine a first number of specified code review approvals that represents the currently assigned number of approvals associated with the source code. Processing logic may then decrease the first number of specified code review approvals to a second number of specified code review approvals to complete the code review stage, where the second number is less than the first number. For example, if the current number of code review approvals is two (e.g., two code reviewers should approve the changes to the source code for it to complete the code review stage), processing logic may increase the number to a number lower than two (e.g., one, none.).

At block 710, processing logic determines the identity of a specified code review approver. At block 715, processing logic sends a notification to the specified code review approver.

At block 720, processing logic decreases a first number of code deployment approvals to a second number of code deployment approvals to complete a code deployment stage of the software development pipeline, where the second number is less than the first number. In some implementations, processing logic may determine a first number of specified code deployment approvals that represents the currently assigned number of approvals associated with deploying the source code. Processing logic may then decrease the first number of specified code deployment approvals to a second number of specified code deployment approvals to complete the code deployment stage, where the second number is less than the first number. For example, if the current number of code deployment approvals is two (e.g., two approver should approve the deployment of the source code), processing logic may decrease the number to a number less than two (e.g., one, none.).

At block 725, processing logic determines the identity of a code deployment approver. At block 730, processing logic sends a notification to the code deployment approver. At block 735, processing logic decreases an amount of testing to complete a testing stage of the software development pipeline. After block 635, the method of FIG. 6 terminates.

Figure 8:
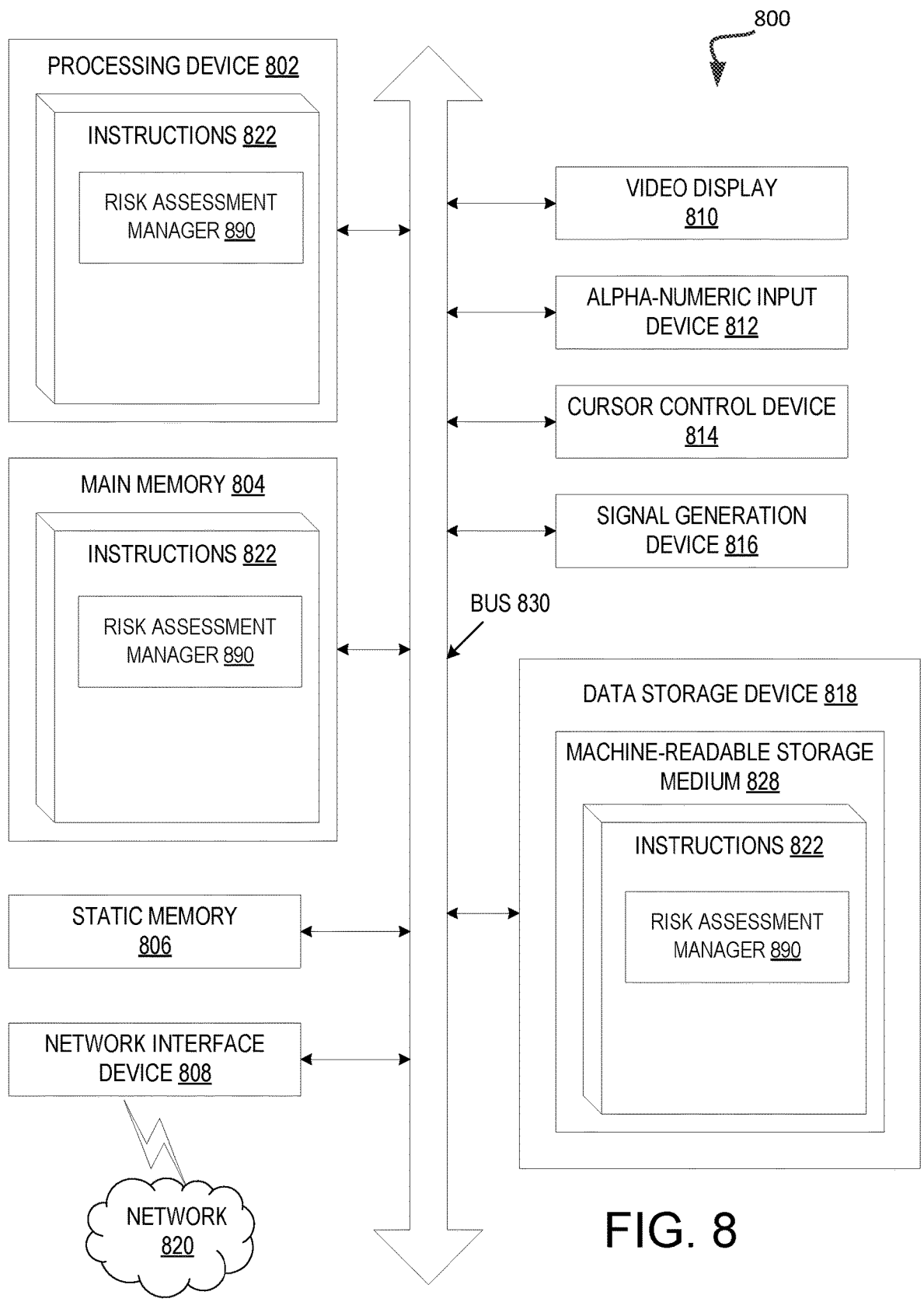
FIG. 8 is a schematic block diagram that provides one example illustration of a computing device executing one or more components of a risk assessment manager, according to one embodiment of the present disclosure.

FIG. 8 illustrates a diagrammatic representation of a machine in the exemplary form of a computer system (computing device) 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (e.g., a processor) 802, a main memory device 804 (e.g., read-only memory (ROM), flash memory, dynamic random access memory (DRAM) such as synchronous DRAM (SDRAM)), a static memory device 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions for one or more components 890 of a risk assessment manager for performing the operations discussed herein.

The computer system 800 may further include a network interface device 808. The computer system 900 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions of components 890 for the risk assessment manager embodying any one or more of the methodologies or functions described herein. The instructions may also reside, completely or at least partially, within the main memory 904 and/or within processing logic of the processing device 802 during execution thereof by the computer system 800, the main memory 804 and the processing device 802 also constituting computer-readable media.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "detecting", "generating", "identifying", "comparing", "determining", executing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Accordingly, it will be appreciated that a variety of programming languages, specification languages and/or verification tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting a new version of source code for a program to be deployed by a software deployment pipeline;
    generating a new abstract syntax tree (AST) for the new version of the source code;
    identifying a previous AST that is associated with a previous version of the source code;
    comparing the new AST to the previous AST to identify a difference between the new AST and the previous AST, wherein the difference comprises a branch of the new AST that represents an update to the previous version of the source code;
    determining a risk weight value associated with the branch of the new AST using an indicator of an execution rate of the branch of the new AST;
    determining that the risk weight value meets or exceeds a threshold value associated with high risk software; and
    executing a high risk deployment protocol for the new version of the source code within the software deployment pipeline.

2. The method of claim 1, wherein executing the high risk deployment protocol comprises:
    increasing a first number of code review approvals to a second number of code review approvals to complete a code review stage of the software deployment pipeline;
    determining a first identity of a code review approver;
    sending a first notification to the code review approver;
    increasing a first number of code deployment approvals to a second number of code deployment approvals to complete a code deployment stage of the software deployment pipeline;
    determining a second identity of a code deployment approver;
    sending a second notification to the code deployment approver; and
    increasing an amount of testing to complete a testing stage of the software deployment pipeline.

3. The method of claim 1, further comprising:
    identifying an additional difference between the new AST and the previous AST, wherein the additional difference comprises an additional branch of the new AST that represents an additional update to the previous version of the source code;
    determining an additional risk weight value associated with the additional branch of the new AST; and
    determining a combined risk weight value by combining the risk weight value and the additional risk weight value.

4. The method of claim 1, wherein determining the risk weight value comprises:
    determining a total number of branches included in the new AST;
    determining a statistical probability of executing the branch of the new AST based at least in part on the total number of branches in the new AST, wherein the statistical probability contributes to the indicator of the execution rate; and
    determining the risk weight value for the branch of the new AST using the statistical probability.

5. The method of claim 1, wherein determining the risk weight value comprises:
    determining a unique identifier associated with the branch of the new AST;
    receiving captured execution metrics associated with the unique identifier;
    determining a percentage of total executions of the program that are attributable to the branch of the new AST based on the captured execution metrics, wherein the percentage contributes to the indicator of the execution rate; and
    determining the risk weight value for the branch based on the percentage.

6. A method comprising:
    detecting a new version of source code for a program to be deployed by a software development workflow;
    determining a portion of the new version of the source code that comprises one or more updates to a previous version of the source code;
    determining a risk weight value associated with the one or more updates using an indicator of an execution rate of the new version comprising the one or more updates;
    determining whether the risk weight value meets or exceeds a threshold value; and
    responsive to determining that the risk weight value falls below the threshold value, preventing execution of a high risk deployment protocol for the new version of the source code within the software development workflow.

7. The method of claim 6, wherein executing the high risk deployment protocol comprises:
    increasing a first number of code review approvals to a second number of code review approvals to complete a code review stage of the software development workflow;
    determining a first identity of a code review approver;
    sending a first notification to the code review approver;
    increasing a first number of code deployment approvals to a second number of code deployment approvals to complete a code deployment stage of the software development workflow;
    determining a second identity of a code deployment approver;
    sending a second notification to the code deployment approver; and
    increasing an amount of testing to complete a testing stage of the software development workflow.

8. The method of claim 6, further comprising:
    responsive to determining that the risk weight value does not meet the threshold value, executing a low risk deployment protocol for the new version of the source code within the software development workflow.

9. The method of claim 8, wherein executing the low risk deployment protocol comprises:

decreasing a first number of code review approvals to a second number of code review approvals to complete a code review stage of the software development workflow;
determining a first identity of a code review approver;
sending a first notification to the code review approver;
decreasing a first number of code deployment approvals to a second number of code deployment approvals to complete a code deployment stage of the software development workflow;
determining a second identity of a code deployment approver;
sending a second notification to the code deployment approver; and
decreasing an amount of testing to complete a testing stage of the software development workflow.

10. The method of claim 6, wherein determining the portion of the new version of the source code that comprises one or more updates to a previous version of the source code comprises:
generating a new abstract syntax tree (AST) for the new version of the source code;
identifying a previous AST that is associated with a previous version of the source code; and
comparing the new AST to the previous AST to identify a difference between the new AST and the previous AST, wherein the difference comprises a branch of the new AST that represents an update to the previous version of the source code.

11. The method of claim 10, further comprising:
identifying an additional difference between the new AST and the previous AST, wherein the additional difference comprises an additional branch of the new AST that represents an additional update to the previous version of the source code;
determining an additional risk weight value associated with the additional branch of the new AST; and
determining a combined risk weight value by combining the risk weight value and the additional risk weight value.

12. The method of claim 10, wherein determining the risk weight value comprises:
determining a total number of branches included in the new AST;
determining a statistical probability of executing the branch of the new AST based at least in part on the total number of branches in the new AST, wherein the statistical probability contributes to the indicator of the execution rate; and
determining the risk weight value for the branch of the new AST using the statistical probability.

13. The method of claim 10, wherein determining the risk weight value comprises:
determining a unique identifier associated with the branch of the new AST;
receiving captured execution metrics associated with the unique identifier;
determining a percentage of total executions of the program that are attributable to the branch of the new AST based on the captured execution metrics, wherein the percentage contributes to the indicator of the execution rate; and
determining the risk weight value for the branch based on the percentage.

14. The method of claim 6, further comprising:
identifying historical deployment metadata associated with the previous version of the source code, wherein the historical deployment metadata comprises at least one of a failure rate associated with a particular software developer, failure rate of the previous version of the source code, risk assessment data associated with a subsystem for the previous version of the source code, or a sensitivity rating of information accessible to the previous version of the source code;
determining a risk multiplier associated with the historical deployment metadata;
determining an updated risk weight value by applying the risk multiplier to the risk weight value; and
responsive to determining that the updated risk weight value meets the threshold value, executing the high risk deployment protocol for the new version of the source code within the software development workflow.

15. The method of claim 6, further comprising:
identifying historical performance metadata associated with the previous version of the source code, wherein the historical performance metadata comprises at least one of a CPU utilization rate of the previous version of the source code or a memory usage rate of the previous version of the source code;
determining a risk multiplier associated with the historical performance metadata;
determining an updated risk weight value by applying the risk multiplier to the risk weight value; and
responsive to determining that the updated risk weight value meets the threshold value, executing the high risk deployment protocol for the new version of the source code within the software development workflow.

16. A system comprising:
one or more memory devices; and
one or more processing devices, wherein the one or more processing devices is operatively coupled to at least one of the one or more memory devices, wherein the one or more processing devices are configured to:
detect that a new version of source code for a program is available to be deployed by a software deployment pipeline;
generate a new abstract syntax tree (AST) for the new version of the source code;
identify a previous AST that is associated with a previous version of the source code;
compare the new AST to the previous AST to identify a difference between the new AST and the previous AST, wherein the difference comprises a branch of the new AST that represents an update to the previous version of the source code;
determine a risk weight value associated with the branch of the new AST using an indicator of an execution rate of the branch of the new AST;
determine whether the risk weight value meets a threshold value associated with high risk software;
responsive to determining that the risk weight value meets the threshold value, execute a high risk deployment protocol for the new version of the source code within the software deployment pipeline; and
responsive to determining that the risk weight value does not meet the threshold value, execute a low risk deployment protocol for the new version of the source code within the software deployment pipeline.

17. The system of claim 16, wherein to execute the high risk deployment protocol, the one or more processing devices are further to:

increase a first number of code review approvals to a second number of code review approvals to complete a code review stage of the software deployment pipeline;

determine a first identity of a code review approver;

send a first notification to the code review approver;

increase a first number of code deployment approvals to a second number of code deployment approvals to complete a code deployment stage of the software deployment pipeline;

determine a second identity of a code deployment approver;

send a second notification to the code deployment approver; and increase an amount of testing to complete a testing stage of the software deployment pipeline.

18. The system of claim 16, wherein to execute the low risk deployment protocol, the one or more processing devices are further to:

decrease a first number of code review approvals to a second number of code review approvals to complete a code review stage of the software deployment pipeline;

determine a first identity of a code review approver;

send a first notification to the code review approver;

decrease a first number of code deployment approvals to a second number of code deployment approvals to complete a code deployment stage of the software deployment pipeline;

determine a second identity of a code deployment approver;

send a second notification to the code deployment approver; and decrease an amount of testing to complete a testing stage of the software deployment pipeline.

19. The system of claim 16, wherein to determine the risk weight value, the one or more processing devices are further to:

determine a total number of branches included in the new AST;

determine a statistical probability of executing the branch of the new AST based at least in part on the total number of branches in the new AST, where the statistical probability contributes to the indicator of the execution rate; and determine the risk weight value for the branch of the new AST using the statistical probability.

20. The system of claim 16, wherein to determine the risk weight value, the one or more processing devices are further to:

determine a unique identifier associated with the branch of the new AST;

receive captured execution metrics associated with the unique identifier;

determine a percentage of total executions of the program that are attributable to the branch of the new AST based on the captured execution metrics, wherein the percentage contributes to the indicator of the execution rate; and determine the risk weight value for the branch based on the percentage.

\* \* \* \* \*